(12) United States Patent
Williams

(10) Patent No.: US 7,434,825 B2
(45) Date of Patent: Oct. 14, 2008

(54) DEPLOYABLE STEP FOR MOTOR VEHICLES

(75) Inventor: Bruce Preston Williams, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 856 days.

(21) Appl. No.: 10/604,304

(22) Filed: Jul. 9, 2003

(65) Prior Publication Data

US 2005/0006870 A1 Jan. 13, 2005

(51) Int. Cl.
*B60D 1/60* (2006.01)
*B62C 3/00* (2006.01)

(52) U.S. Cl. .............. 280/507; 280/163; 280/166

(58) Field of Classification Search ........... 280/163, 280/166, 164.1, 507; 293/155, 119, 106; 105/449
See application file for complete search history.

(56) References Cited

U.S. PATENT DOCUMENTS

| | | | |
|---|---|---|---|
| 2,672,363 A | | 3/1954 | Bunchanan |
| 3,507,515 A | | 4/1970 | Brammer |
| 3,580,613 A | | 5/1971 | Northrop |
| 3,588,160 A | * | 6/1971 | Reimer ................ 280/166 |
| 3,627,350 A | * | 12/1971 | Cross ................. 280/166 |
| 3,927,903 A | | 12/1975 | Jones |
| 4,191,388 A | | 3/1980 | Barksdale |
| 4,198,070 A | * | 4/1980 | Weiler ................ 280/166 |
| 4,893,856 A | * | 1/1990 | Council .............. 293/106 |
| 5,358,067 A | | 10/1994 | Ford et al. |
| 5,678,872 A | | 10/1997 | Slater |
| 6,145,865 A | | 11/2000 | Cannara et al. |
| 6,170,842 B1 | * | 1/2001 | Mueller ............... 280/163 |
| 6,685,204 B1 | * | 2/2004 | Hehr ................. 280/166 |
| 6,874,806 B1 | * | 4/2005 | Blake ................ 150/166 |

* cited by examiner

*Primary Examiner*—Hau V Phan
(74) *Attorney, Agent, or Firm*—Dickinson Wright PLLC; Greg Brown

(57) ABSTRACT

A motor vehicle in accordance with the present invention includes a body having a front end, a rear end, a roof, and a rear structural member located at the rear end of the body. A motor vehicle further includes a plurality of wheels coupled to the body. A pair of brackets is coupled to the rear structural member. A rear bumper is configured to both cover the structural member and to allow for access to the brackets. A step is pivotally coupled to the brackets, and therefore to the structural member and motor vehicle. The step is operative to articulate about an axis between a first and second position.

10 Claims, 5 Drawing Sheets

DEPLOYABLE STEP FOR MOTOR VEHICLES

BACKGROUND OF INVENTION

1. Technical Field of Invention

The present invention generally relates to motor vehicles. In particular, the present invention relates to a deployable step for motor vehicles.

2. Background of Invention

Trucks and sport utility vehicles have become commonplace as a means for everyday transportation on roads around the world, as well as for both on-road and off-road recreational uses. These vehicles tend to be tall in comparison to typical passenger automobiles, and often include accessories on the roof of the vehicle such as luggage racks, bike racks, and other similar storage devices. Additionally, these vehicles are almost universally equipped with a trailer hitch that can be used for, among other things, towing campers, boats, and trailers.

The height of these vehicles, combined with the use of the rooftops for a variety of purposes, is such that the average person cannot reach the top of the vehicle to remove the stored cargo or for other purposes, such as washing the vehicle, without stepping on either the bumper of the vehicle, which is at a height that may be difficult for the average person to get to, or a step stool of some sort. Accordingly, a need exists for a device that is integral with the vehicle and that will allow a person to reach the top of these types of vehicles, while at the same time, not interfering with the use of the trailer hitch.

Devices aiming to satisfy this need have been developed, however, they are not without their downfalls. For instance, U.S. Pat. No. 6,145,865 entitled "COMBINED TRAILER HITCH COVER AND STEP ASSEMBLY" discloses the use of a step apparatus coupled to the trailer hitch of a vehicle that, when in a first position, serves as a cover for the trailer hitch, and when in a second position, serves as a step. However, there are numerous disadvantages associated with this device and others currently in use. For one, the apparatus does not allow the trailer hitch to be used independent of the step. The step must be deployed in some fashion or removed in order to use the hitch. Second, the mounting of the step on the hitch apparatus itself results in a less than optimal step height from the ground. The step height in relation to the ground in this arrangement is slightly lower than that of the bumper, which, therefore, does not provide for the maximum height benefit. Third, when the apparatus is in its first, or "up", stowed, position, the apparatus is not flush with the contours of the bumper, resulting in less than desirable aesthetics and less than optimized packaging.

Accordingly, it is the objective of the present invention to provide a device that minimizes or eliminates one or more of the foregoing problems.

SUMMARY OF INVENTION

A motor vehicle in accordance with the present invention includes a body having a front end, a rear end, and a roof. A motor vehicle according to the present invention further includes a plurality of wheels coupled to the body, and a rear structural member located at the rear end of the body. A motor vehicle in accordance with the present invention also has a pair of brackets associated with, and coupled to, the rear structural member, and which are spaced a predetermined distance apart. A motor vehicle according to the present invention further includes a rear bumper that is configured to both cover the structural member, as well as to allow for access to the brackets. A motor vehicle in accordance with the present invention further includes a step that is pivotally coupled to the brackets, and therefore to the structural member and motor vehicle. The step is operative to articulate about an axis between a first and second position.

The above configuration allows for the step of the present invention to be at an optimal height off the ground when fully deployed in the second position, and also allows for the use of a trailer hitch on a motor vehicle independent of the position of the step.

Additional benefits and advantages, as well as objects and features of the present invention will become apparent after reading the detailed description and claims set forth below in conjunction with the accompanying drawings.

DETAILED DESCRIPTION

Figure 1:
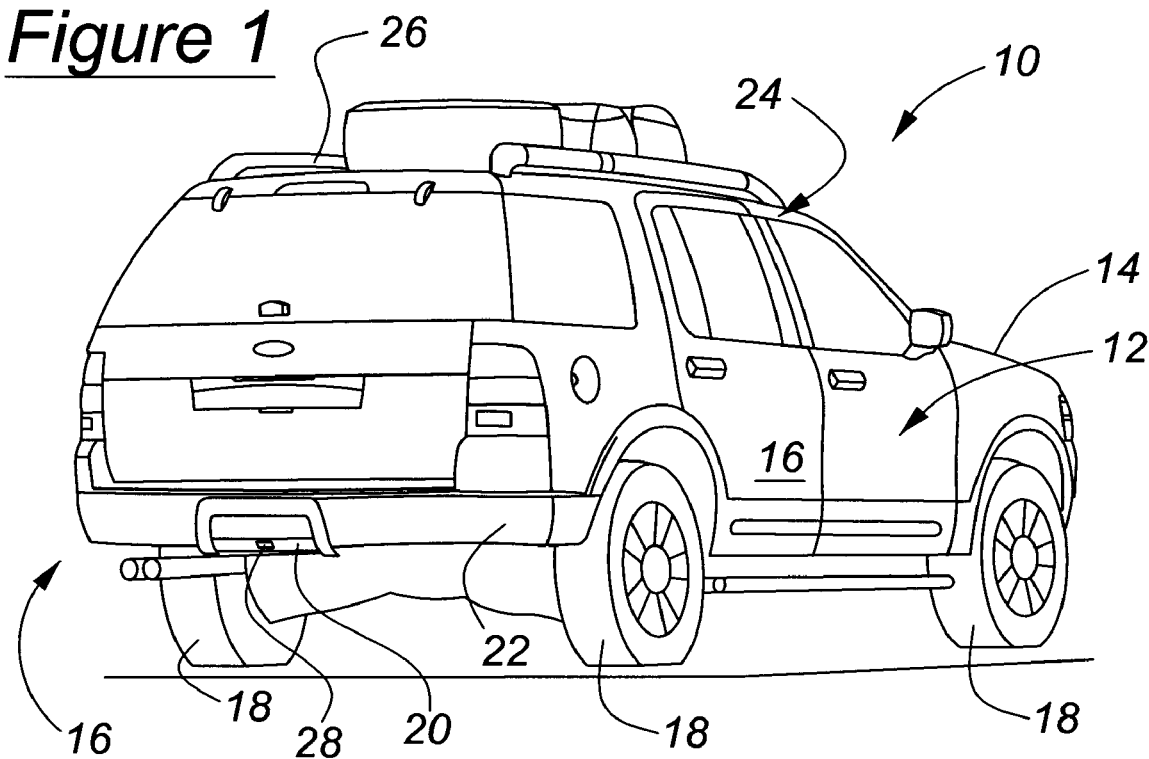
FIG. 1 is a perspective view of a motor vehicle in accordance with the present invention.

Referring now to the drawings wherein like reference numerals are used to identify identical components in the various views, FIG. 1 is a perspective view of a motor vehicle 10 in accordance with the present invention. Motor vehicle 10 may take many forms such as a sport utility vehicle (as shown in FIG. 1), a van, or a truck. It should be noted, however, that these are exemplary only, and not meant to be limiting in nature.

With continued reference to FIG. 1, motor vehicle 10 includes a body 12 having a front end 14 and rear end 16, and further includes a plurality of wheels 18 coupled to body 12; a rear structural member 20; and a rear bumper 22 covering most of structural member 20. Body 12 includes a roof 24 of vehicle 10, and may include a storage device 26 located on roof 24.

Figure 2:
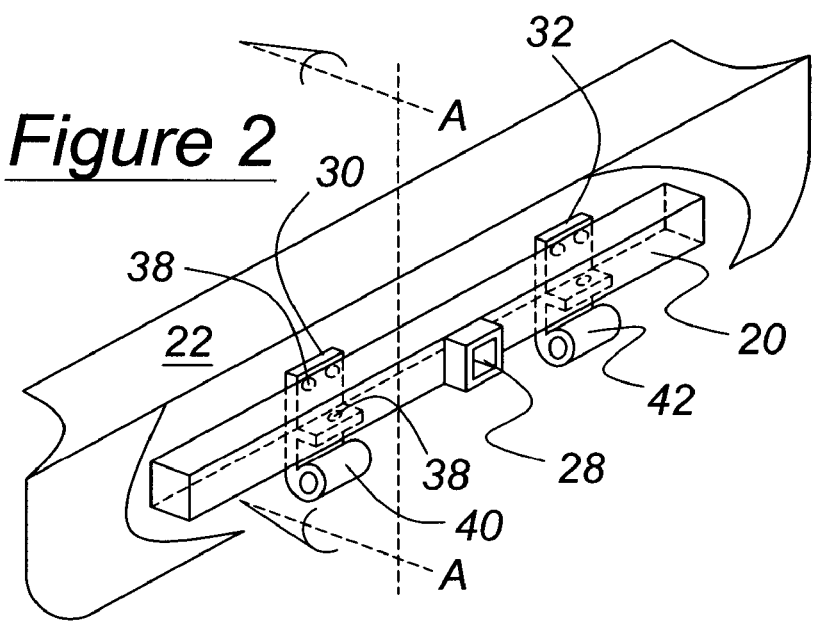
FIG. 2 is a partial perspective view of the rear of a motor vehicle illustrating the relationship between the bumper, the structural member, the hitch, and step mounting brackets in accordance with the present invention.

FIG. 2 is a partial perspective view of the rear of the vehicle, wherein the relationship between various components of the present invention are illustrated. Structural member 20 may be a rear frame cross-member, bumper frame member, or other latitudinal frame members known in the art and suggested by this disclosure. As can be seen in the FIG. 2, bumper 22 has a top and bottom, and may be contoured for aesthetic purposes. Bumper 22 is placed in a manner so that it serves to encapsulate a large portion of structural member 20, and is shaped so as to leave only a portion of structural member 20 exposed Motor vehicle 10 may also include a trailer hitch 28 integral to, and located within, the exposed region of structural member 20. Structural member 20 may further include a pair of brackets 30, 32 spaced a predetermined distance apart and suitable for mating with the step 34 (not shown in FIG. 2) of the present invention, which is discussed in detail below.

Figure 2A:
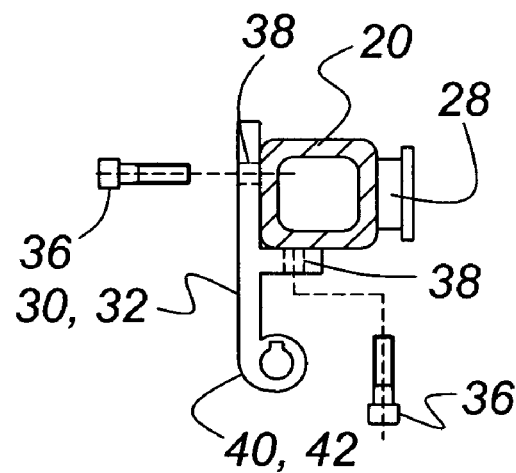
FIG. 2A is a cross sectional view of the structural member, the hitch, and the step mounting brackets along the line A-A of FIG. 2, in accordance with the present invention.

In one embodiment, structural member 20 may be formed with brackets 30, 32 integral therewith; while in a second embodiment brackets 30, 32 may be separate pieces formed independent of structural member 20, and then coupled to structural member 20 using mechanical fastening methods known in the art, including, but not limited to, welding or inserting bolts 36 through bolt holes 38 in brackets 30, 32 (best shown in FIGS. 2A and 5), and then into structural member 20. If motor vehicle 10 includes a trailer hitch 28, then bracket 30 may be placed on one side of hitch 28, and bracket 32 may be placed on the other side of hitch 28, with brackets 30, 32 being spaced a predetermined distance apart. It should be noted that this embodiment is meant to be exemplary only, and not limiting in nature. Other embodiments, such as attaching brackets 30, 32 to bumper 22 itself, are also within the spirit and scope of the invention.

Figure 3:
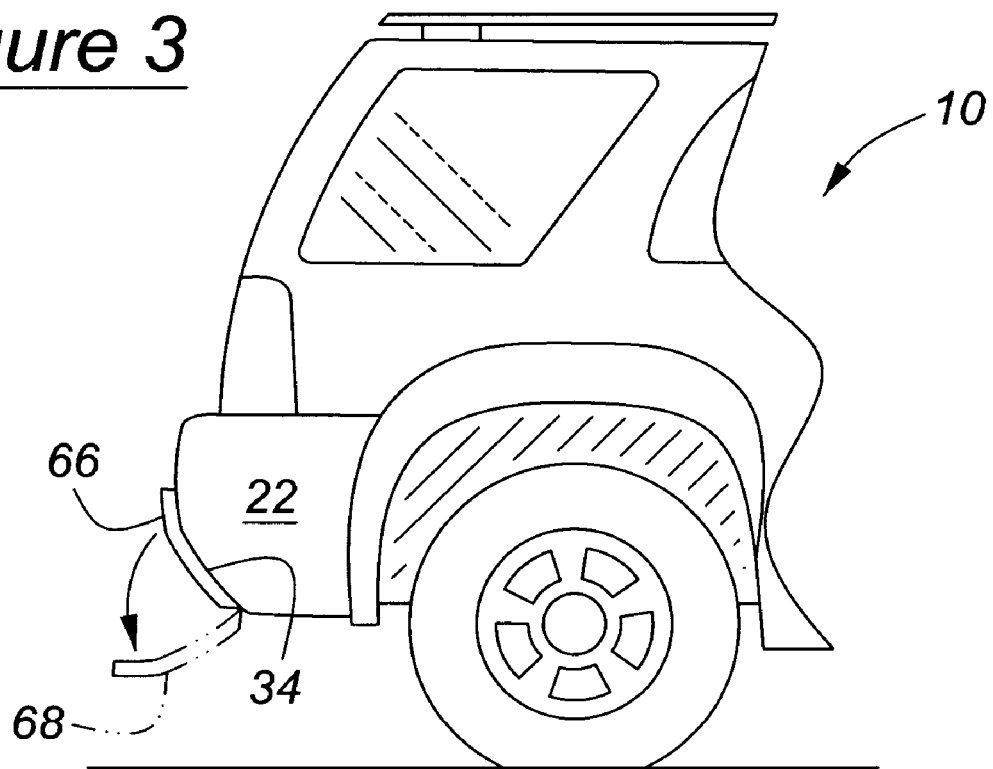
FIG. 3 is a side view of the rear of a motor vehicle in accordance with the present invention showing the height of the step relative to the ground and the bumper of the motor vehicle.

As can be seen in FIG. 2, brackets 30, 32 extend a predetermined distance from structural member 20. In the illustrated embodiment, brackets 30, 32 extend down a predetermined distance below the bottom of bumper 22. This is done so as to allow for the optimal hinging point of the step of the present invention so that the step, when fully deployed, is an intermediate distance from the ground as compared to bumper 22 and known step devices (best shown in FIG. 3). This represents one of the advantages of this invention as compared to other step devices known in the art, which, when in a deployed state, are closer to the height of bumper 22. Each bracket 30, 32 also includes a means for coupling step 34 to structural member 20. In a preferred embodiment, each bracket 30, 32 includes a first sleeve 40, 42, respectively, at the bottom of brackets 30, 32 suitable for use in coupling step 34 to structural member 20. It should be noted that these configurations are exemplary only, and not meant to be limiting in nature. Other configurations are within the scope and spirit of the invention.

Figure 4:
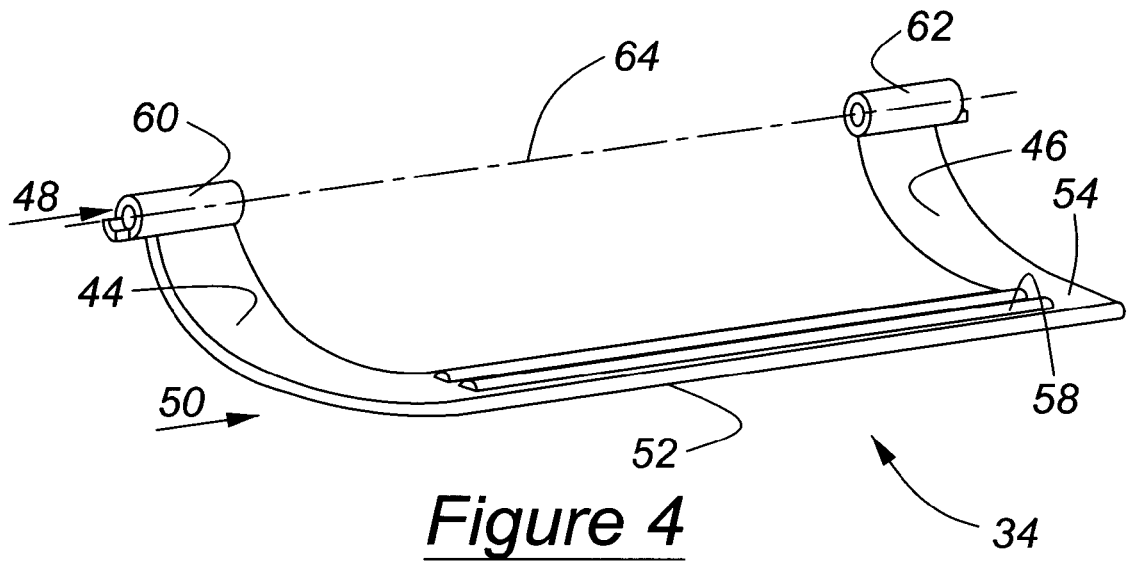
FIG. 4 is a perspective view of a step in accordance with the present invention.

With reference to FIG. 4, step 34, in a preferred embodiment, may be in the shape of the letter "U". Accordingly, step 34, includes a pair of legs 44, 46, each having a first end 48 and a second end 50; and a planar member 52 disposed between legs 44, 46 at second end 50 of each leg. Planar member 52 includes a first side 54, a second side 56 (shown in FIGS. 6 and 8), and a plurality of traction improving grooves 58 located on first side 54, which extend for the length of planar member 52 from leg 44 to leg 46. Legs 44, 46 are substantially non-planar and allow the u-shape step 34 to take on a three-dimensional form that can match the shape and contour of bumper 22. In a preferred embodiment, step 34 is formed of metal, however, step 34 may also be formed of other metallic, non-metallic, or composite materials of suitable strength. Step 34 also includes a means for coupling to brackets 30, 32, and therefore, structural member 20. In a preferred embodiment, legs 44, 46 have a second sleeve 60, 62, respectively, located at first end 48 of legs 44, 46. Second sleeves 60, 62 are also configured in a way that will allow each of them to mate with first sleeves 40, 42, respectively, of brackets 30, 32.

Figure 5:
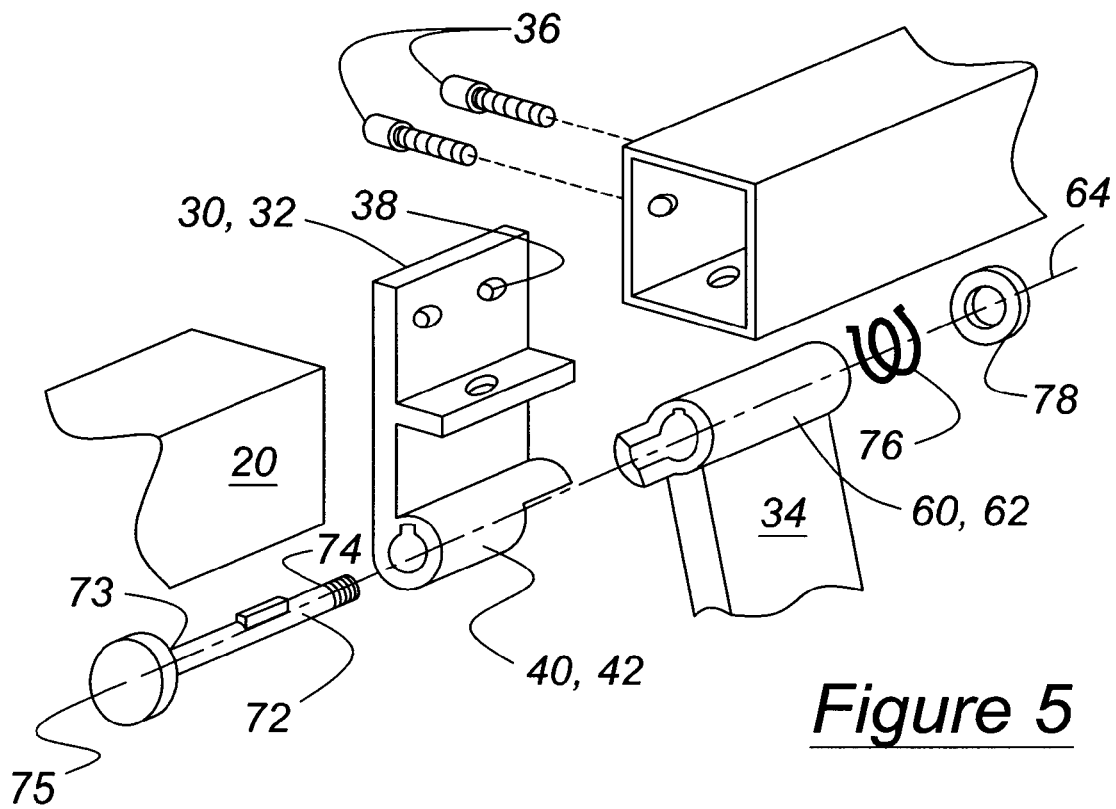
FIG. 5 is a partial perspective view showing the relationship between, and assembly of, the brackets and step in accordance with the present invention.
Figure 6:
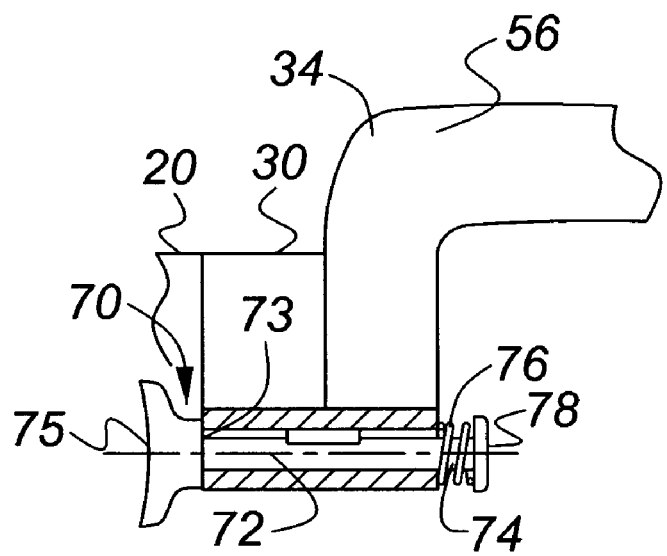
FIG. 6 is a partial perspective view of the step and lock-out mechanism when the step is in a first position in accordance with the present invention.
Figure 7:
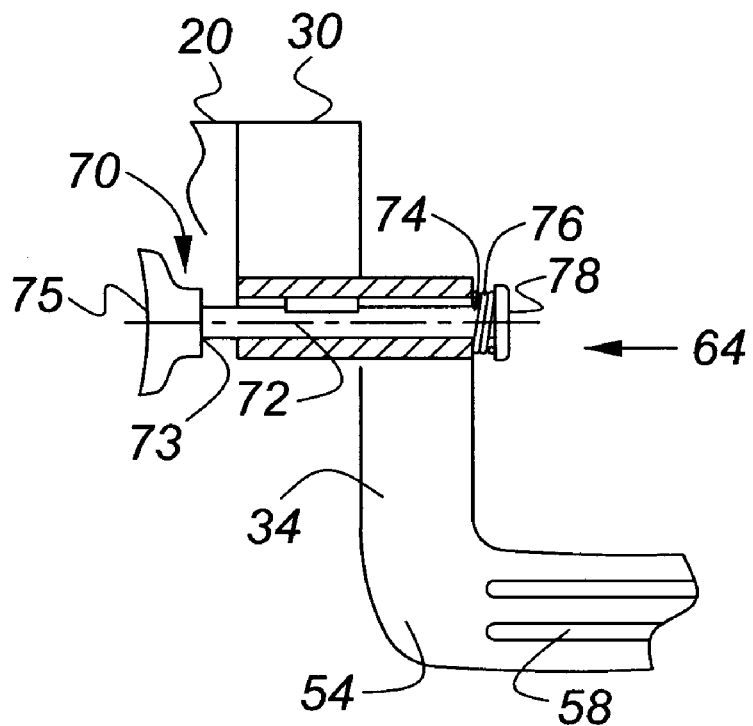
FIG. 7 is a partial perspective view of the step and locking mechanism when the step is in a second position in accordance with the present invention.
Figure 8:
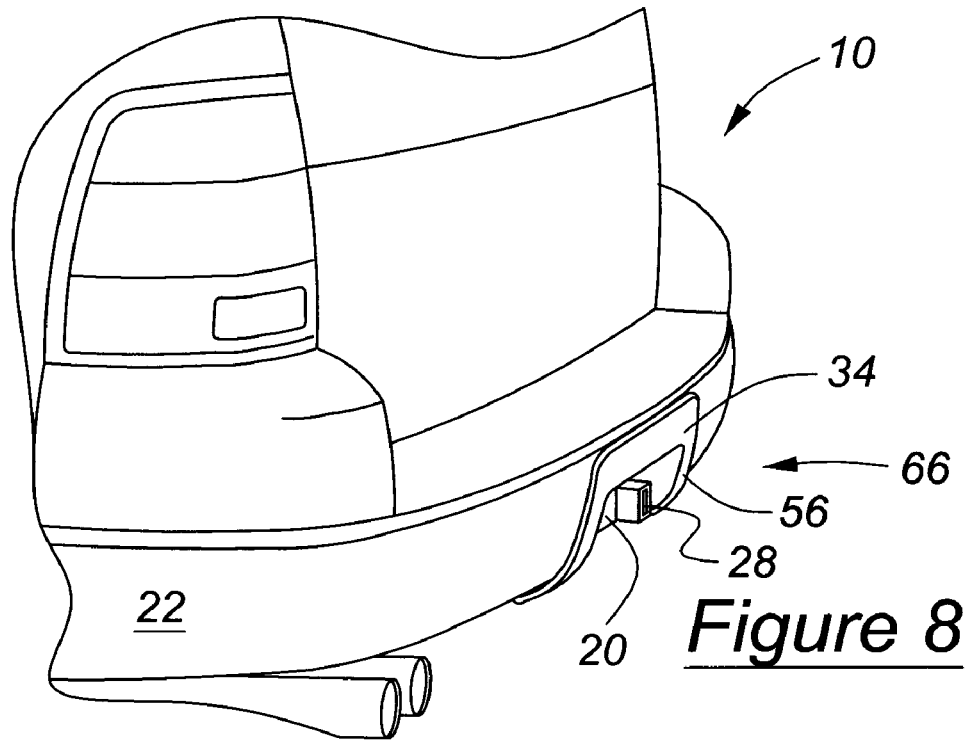
FIG. 8 is a perspective view of the rear of the motor vehicle in accordance with the present invention illustrating the step in a locked, stowed position.
Figure 9:
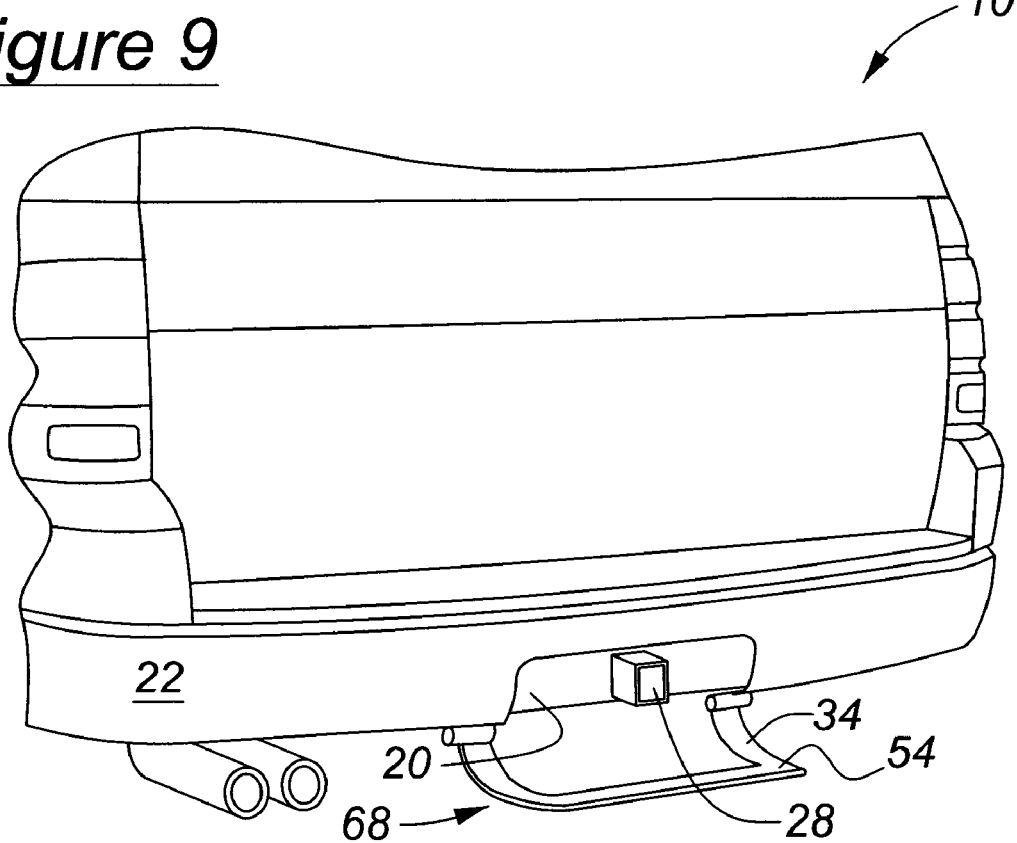
FIG. 9 is a perspective view of the rear of the motor vehicle similar to FIG. 7, except the step is in a deployed position.

With reference to FIGS. 5-7, step 34 is pivotally coupled to brackets 30, 32, and therefore structural member 20 and motor vehicle 10, in a manner that will allow step 34 to articulate about a laterally extending axis 64 defined by sleeves 60, 62, between a first position 66 (best shown in FIGS. 6 and 8), and a second position 68 (best shown in FIGS. 7 and 9). Step 34 may be pivotally coupled to brackets 30, 32 in ways known in the art. In a preferred embodiment, first sleeves 40, 42 of brackets 30, 32 are mated with second sleeves 60, 62. In one embodiment, a spring loaded sliding lockout key 70 is then inserted into the combination of first sleeve 40 and second sleeve 60 on bracket 30. The spring loaded sliding lockout key 70 is comprised of a sliding lock pin 72 having a first end 73 and a second end 74, a handle 75 located on first end 73 of pin 72, a spring 76, and a retainer 78. Second end 74 of pin 72 is inserted through the first sleeve 40, and then through the second sleeve 60 of the combination. Once pin 72 has been inserted, spring 76 is positioned on second end 74 of pin 72, and then retainer 78 is installed on second end 74 to keep spring 76 in place. Second end 74 and retainer 78 may be threaded to allow for retainer 78 to be screwed onto pin 72. It should be noted that while this is a preferred embodiment of coupling step 34 with motor vehicle 10, it is meant to be exemplary only, and not limiting in nature. For instance, in another embodiment, lockout key 70 may be inserted into the combination of first sleeve 42 and second sleeve 62 on bracket 32. Additionally, other friction based methods are also within the spirit and scope of this invention. Once spring loaded sliding lockout key 70 is installed, step 34 may be articulated between first position 66 and second position 68.

FIGS. 6 and 8 show step 34 in first position 66. In first position 66, step 34 can be considered to be "up", or in a locked, stowed position. In this position, planar member 52 is substantially vertically oriented in relation to the ground, and the contouring of legs 44, 46 allows for step 34 to be flush with bumper 22. The u-shape of step 34 also allows for the accessibility to trailer hitch 28 without having to deploy step 34 into its second position 68. This represents another advantage of this invention in that trailer hitch 28 may be used independent of step 34. When step 34 is in this position, spring loaded sliding lockout key 70 locks step 34 into place, thereby preventing step 34 from deploying.

FIGS. 7 and 9 show step 34 in second position 68. To deploy step 34, and therefore transition from first position 66 to second position 68, handle 75 can be pulled in a direction along axis 64 and away from step 34, thereby compressing spring 76, and effectively unlocking step 34 (best shown in FIG. 7). Once unlocked, step 34 can be pulled at an angle that is both away from motor vehicle 10 and down towards the ground, which will allow for step 34 to travel for approximately 90 degrees of rotation into a fully deployed second position 68. Once in position 68, planar member 52 is substantially horizontally oriented in relation to the ground, and first side 54 of planar member 52 is now configured to serve as a stepping surface. The height of step 34 in relation to the ground when fully deployed in position 68 is such that step 34 and bumper 22 may serve as a "staircase" of sorts, wherein a person may step from the ground, to step 34, and then to bumper 22.

To return step 34 to its locked, stowed position, step 34 is raised and the rotating motion of second sleeves 60, 62 in relation to first sleeves 40, 42 results in the decompression of spring 76 (best shown in FIG. 6), thereby causing spring loaded lockout key 70 to return to its locked state.

While the example described above serves as a preferred embodiment of the present invention, it should be noted that other configurations and embodiments for the present invention exist that are within the spirit and scope of the invention. For instance, those skilled in the art will appreciate, in light of the above disclosure, that the deployable step could be mounted at either end of a motor vehicle.

The invention claimed is:

1. A motor vehicle comprising:
a body having a front end, a rear end and a roof; a plurality of wheels coupled to said body;
a rear structural member located at said rear end of said body;
a trailer hitch attached to said structural member;
a pair of brackets attached to said structural member and spaced a predetermined distance apart;
a rear bumper configured to both cover said structural member and to allow for access to said brackets; and
a step pivotally coupled to said brackets and operative to articulate about an axis between first and second positions, with said brackets being attached to said structural member such that said trailer hitch is operational when said step is in either of said first or second positions.

2. A motor vehicle according to claim 1, wherein said rear structural member is formed with said brackets integral therewith.

3. A motor vehicle according to claim 1, wherein said brackets are independent pieces and are attached to said rear structural member by one of welding, bolting, and riveting means.

4. A motor vehicle according to claim 1, wherein said brackets extend a predetermined distance from said structural member and said bumper.

5. A motor vehicle according to claim 1, wherein said step is u-shaped having two leg members, with one of said leg members each attached to each of said brackets, and a planar member disposed between said leg members and wherein said planar member has a first side and a second side.

6. A motor vehicle according to claim 5, wherein said planar member is substantially vertically oriented when said step is in said first position, and substantially horizontally oriented to provide a step when in said second position.

7. A motor vehicle according to claim 5, wherein said first side of said step provides a stepping surface when said step is in said second position and wherein said first side includes a plurality of traction improving grooves extending perpendicular to said axis for the length of said planar member.

8. A motor vehicle according to claim 5, wherein said leg members are contoured to render said step flush with said bumper when said step is in said first position.

9. A motor vehicle according to claim 1, further comprising a lockout mechanism for said step.

10. A motor vehicle according to claim 9, wherein said lockout mechanism is a spring loaded sliding lockout key comprising:
a sliding pin having a first and second end; a handle attached to the first end of said pin; a spring positioned on the second end of said pin; and
a retainer positioned on said second end of said pin operative to hold said spring in place.

* * * * *